Oct. 1, 1935.　　　　H. S. HEICHERT　　　　2,015,797

APPARATUS FOR REMOVING PLASTER FROM PLATE GLASS TABLES

Filed Sept. 18, 1934　　　4 Sheets-Sheet 1

INVENTOR.
HERMAN S. HEICHERT
BY Bradley & Bee
ATTORNEYS.

Oct. 1, 1935.   H. S. HEICHERT   2,015,797
APPARATUS FOR REMOVING PLASTER FROM PLATE GLASS TABLES
Filed Sept. 18, 1934   4 Sheets-Sheet 2

INVENTOR.
HERMAN S. HEICHERT
BY
ATTORNEYS.

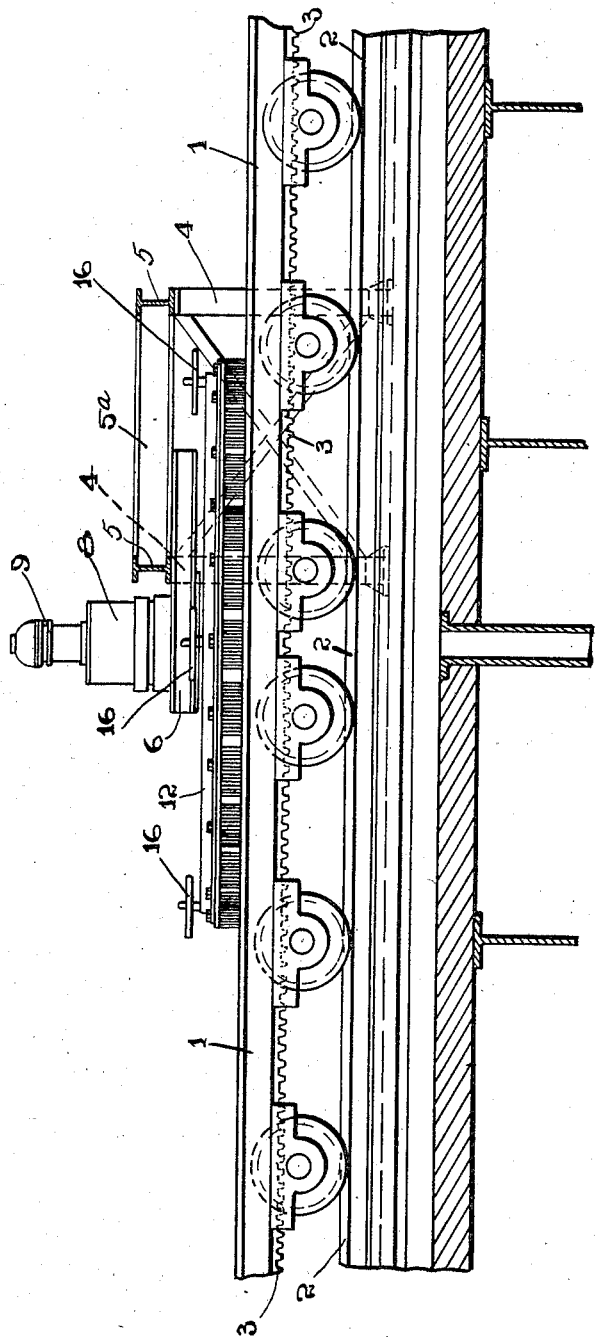

Oct. 1, 1935.  H. S. HEICHERT  2,015,797
APPARATUS FOR REMOVING PLASTER FROM PLATE GLASS TABLES
Filed Sept. 18, 1934   4 Sheets-Sheet 4

INVENTOR.
HERMAN S. HEICHERT
BY Bradley & Bee
ATTORNEYS.

Patented Oct. 1, 1935

2,015,797

UNITED STATES PATENT OFFICE 2,015,797

APPARATUS FOR REMOVING PLASTER FROM PLATE GLASS TABLES

Herman S. Heichert, Pittsburgh, Pa., assignor to Pittsburgh Plate Glass Company, a corporation of Pennsylvania Application September 18, 1934, Serial No. 744,524

6 Claims. (Cl. 15—93)

Figure 1:
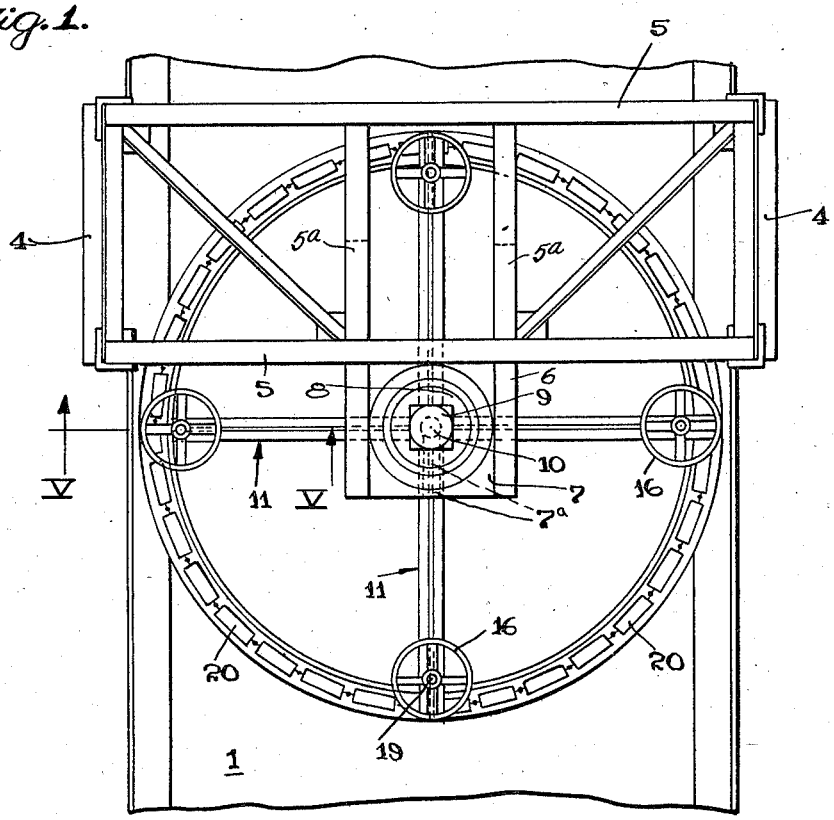
Figure 5:
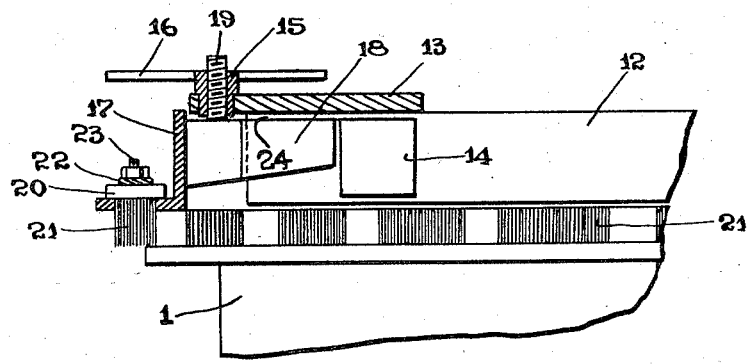
Figure 2:
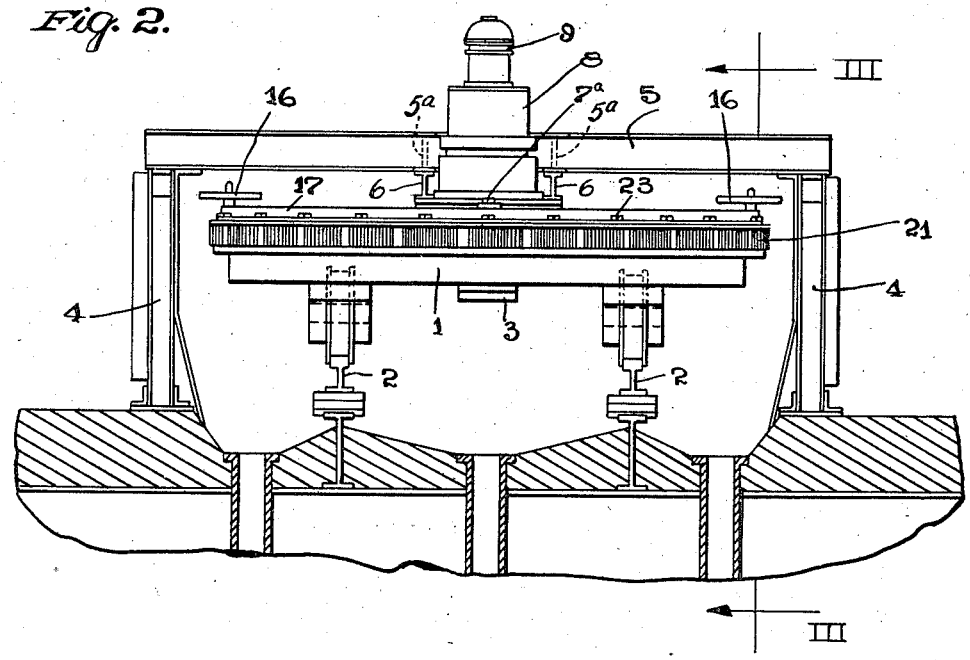
Figure 4:
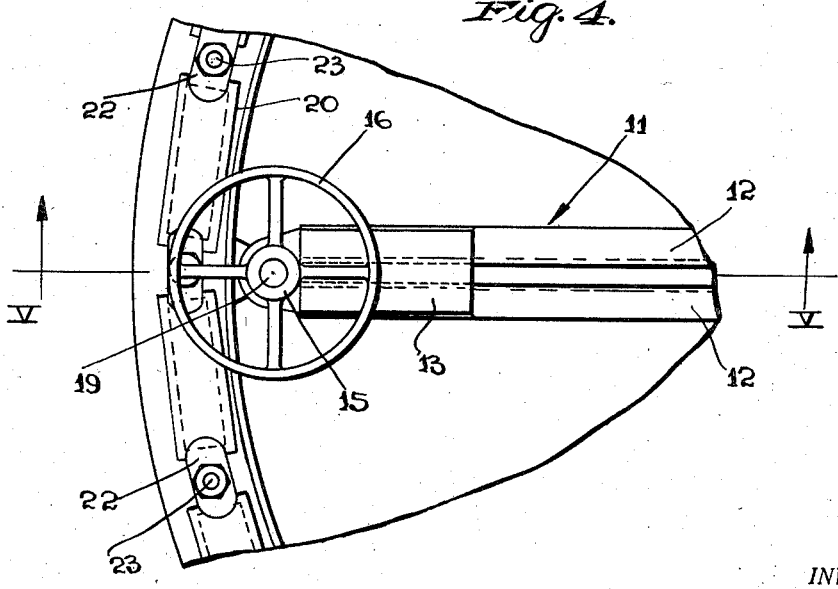
Figure 6:
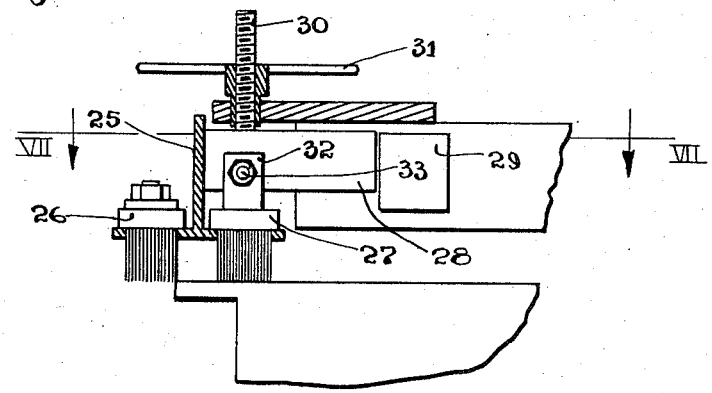
Figure 7:
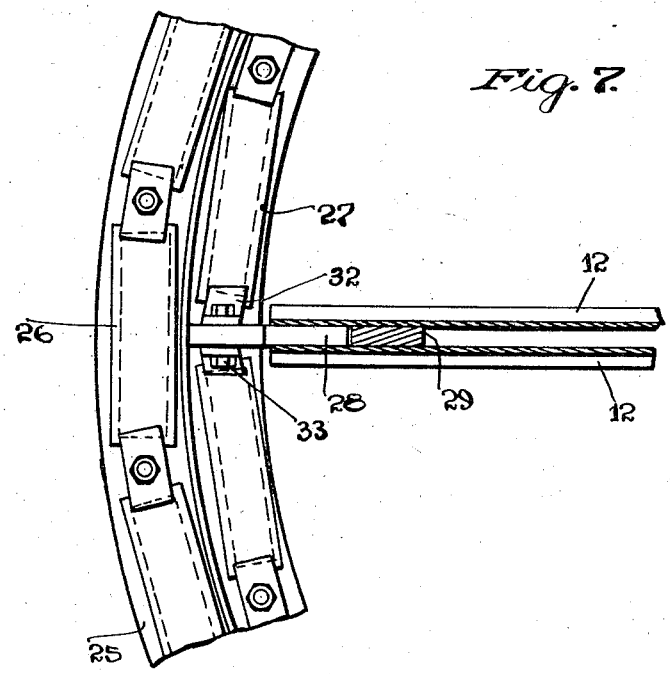

The invention relates to apparatus for removing plaster from the tops of plate glass tables, such as are used in a continuous grinding and polishing system. The glass plates to be surfaced are bedded in plaster of Paris on the tops of the tables, and after the tables have been used and the surfaced glass is removed, it is necessary to remove the hard plaster from the tables before they are used again. This has heretofore been done by the use of manually operated scraping tools or by the use of brushes, such as those shown in the Heichert and Evans Patent No. 1,610,374, wherein a power driven brush is employed above the line of travel of the tables, such brush being mounted on a horizontal axis extending transversely of the tables. While brushes of the type shown in the patent are effective, they wear out rapidly and their cost is relatively high. Further their action is such that they clean the plaster out of small cavities and depressions in the table tops, which should be filled with the plaster, as the glass sheet next applied is better supported if the cavities are filled with the hard plaster. Brushes of this type also abrade away the surface of the table more rapidly than is desirable, particularly at the joints between the tables. The objects of the present invention are the provision of an improved brush construction which overcomes the objections recited above with respect to the brushes now in use; namely, to provide a brush construction which is very cheap and in which the cost of replacement of the brush units is low; which imposes less wear on the table tops; and which cuts away the plaster from the table tops effectively, but leaves any depressions in such tops or joints therebetween filled with hard plaster. Certain embodiments of the invention are illustrated in the accompanying drawings, wherein:

Figure 1 is a plan view. Fig. 2 is an end view. Fig. 3 is a section on the line III—III of Fig. 2. Fig. 4 is an enlarged partial plan view. Fig. 5 is a section on the line V—V of Figs. 1 and 4. And Figs. 6 and 7 are sectional views showing a modification, Fig. 6 being a section on the line VI—VI of Fig. 7, and Fig. 7 being a section on the line VII—VII of Fig. 6.

Referring to the drawings, 1 is one of the tables from whose top the plaster is to be removed, such table being mounted on a track 2 and moved beneath the plaster removing apparatus by any suitable means such as a driven spur gear (not shown) which engages the rack 3 on the bottom of the table. The plaster removing apparatus is carried upon a stand consisting of the standards 4, 4 connected by the commercial sections 5, 5 lying above and extending transversely of the top of the table. A pair of beams 6, 6 are attached to the sections 4, 4, and carry a plate 7 which acts as a platform for supporting the brush spider or support and its motor drive. Lying directly above the beams 6, 6 and welded thereto are a pair of beams 5a, 5a which act as ties between the beams 5, 5.

Seated on the platform is a casing 8 carrying reduction gearing, and on the casing is seated the motor 9 which drives such gearing. The drive shaft 10 of the reducing mechanism carries the spider consisting of the four arms 11, 11, 11, 11 suitably secured together and to the shaft at their inner ends. Preferably these arms each consist of a pair of spaced angles 12, 12 whose outer ends carry the plates 13 welded thereto (Figs. 4 and 5). Also welded to the vertical flanges of the angles adjacent their outer ends are the stop plates 14. The outer ends of the plates 13 are perforated and carry the lower ends of the hubs 15 of the handwheels 16, such hubs being freely movable upward through the perforations for a purpose later explained. The plate 7 is preferably slotted, as indicated at 7a of Figs. 1 and 2, to permit of the removal and replacement of the unit including the spider and its driving means by sliding them horizontally, the slot serving to permit the passage of the drive shaft 10 during such movement.

Extending around the ends of the spider arms is the ring 17 which carries the brush elements, such ring being in the form of an angle having the guide plates 18 welded to its vertical flange. These plates are located at the ends of the spider arms and fit into the spaces between the vertical flanges of the angles 12 which constitute such arms. The plates 14 limit the inward movement of the plates 18 and act as guides therefor. Each of the plates 18 has welded to its upper end a screw 19 which is threaded through the hub 15 of the handwheel.

The horizontal flange of the ring 17 is provided with a plurality of rectangular spaced perforations, and in each perforation is mounted a brush unit. These units each comprise a block or plate 20 ordinarily of wood, in which are mounted the flexible metal strands or strips 21 which engage the plaster on the table and cut it away. The plates 20 overlap the walls of the perforations and are held down against the flange of the ring by means of the clamping plates 22 secured by the bolts 23 (Figs. 4 and 5). When it is necessary to replace the brush units, the bolts are merely loosened and the plates 22 swung through an angle of 90 degrees, so that they no longer overlie the ends of the plates 20.

In operating the apparatus, the hand wheels 16 are adjusted so that the brush elements engage the surface of the table with the weight of the ring 17 imposed thereon and with a space 24 (Fig. 5) between the tops of the plates 18 and the bottoms of the plates 13. The ring is thus free to move up and down or float independently of the spider which rotates it, the upward movement being permitted since the lower ends of the hubs 15 fit freely in sockets or perforations in the plates 13, as heretofore pointed out. As the ends of the brush strands or strips 21 wear away, the hand wheels 16 are adjusted upward on the screws 19 so that the weight of the ring 17 is always imposed on the brush elements regardless of the amount of wear on the brushes. The abrading or cutting action of the brushes thus remains constant while they are being worn down. While the ring is free to float, it is positively guided with respect to the spider due to the sliding engagement of the hubs 15 with their sockets in the plate 13, and to the guiding action of the vertical flanges of the angles 12 and the plates 14 upon the plates 18.

The upkeep of the apparatus, as above described, is low since the only parts requiring replacement due to wear are the brush blocks which cost only a few cents each and can be worn down an inch or more before replacement is required. The labor cost of replacement is also low, due to the ease with which the brush blocks can be released from the ring and replaced, a mere loosening of the bolts 23 being required so that the clamping plates can be swung out of the way. The wear imposed by this brush construction upon the tops of the tables is negligible. Cracks and crevices in the table tops are left filled with hard plaster giving a better sealing surface for the next sheet of glass than has heretofore been the case, and there is no tendency as heretofore to form a groove where the two ends of a pair of tables abut. Other advantages incident to the simplicity and low first cost will be readily apparent to those skilled in the art.

Figs. 6 and 7 illustrate a departure from the construction heretofore described primarily in the substitution of a ring 25 of T cross section for the angle construction of Figs. 1 to 5. This ring has two sets of brush block perforations in its horizontal flange so that there are two rows of brush blocks 26 and 27. The ring is guided on the spider arms by the use of the plates 28 and 29 corresponding to the plates 18 and 14 of the first construction, and adjustment is accomplished by the screw 30 and hand wheel 31. Where the inner row of brush units come opposite the ends of the spider arms, the opposing ends of the plates of the units 27 are held in position by a pair of angle clamps 32 secured by a bolt 33 which extends through a slot in the plate 28.

What I claim is:

1. Apparatus for cleaning plaster from plate glass tables mounted for movement along a track, comprising a support mounted for rotation about a vertical axis above the tables, power means for rotating the support about its axis, a floating ring secured to the support so as to be rotated thereby but free to move up and down relative to the support, and downwardly extending brush elements carried by the ring and adapted to engage the surface of the tables.

2. Apparatus for cleaning plaster from plate glass tables mounted for movement along a track, comprising a support mounted for rotation about a vertical axis above the tables, power means for rotating the support about its axis, a floating ring secured to the support so as to be rotated thereby but free to move up and down relative to the support, and downwardly extending brush elements carried by the ring and adapted to engage the surface of the tables, said elements comprising a series of removable blocks each provided with downwardly extending flexible metal strips adapted to engage the surface of the table.

3. Apparatus for cleaning plaster from plate glass tables mounted for movement along a track, comprising a support mounted for rotation about a vertical axis above the tables, power means for rotating the support about its axis, a floating ring secured to the support so as to be rotated thereby and comprising a horizontal flange provided with a series of spaced slots, a brush element for each slot comprising a plate resting on said flange above the slot and having downwardly extending flexible metal strips to engage the surface of the table, and releasable means for securing the plates to the flange.

4. Apparatus for cleaning plaster from plate glass tables mounted for movement along a track, comprising a support mounted for rotation about a vertical axis above the tables, power means for rotating the support about its axis, a floating ring secured to the support so as to be rotated thereby but free to move up and down relative to the support, comprising a horizontal flange provided with a series of spaced slots, a brush element for each slot comprising a plate resting on said flange above the slot and having downwardly extending flexible metal strips to engage the surface of the table, and releasable means for securing the plates to the flange.

5. Apparatus for cleaning plaster from plate glass tables mounted for movement along a track, comprising a support mounted for rotation about a vertical axis above the tables, power means for rotating the support about its axis, a floating ring secured to the support so as to be rotated thereby but free to move up and down relative to the support, adjustable means for limiting the downward movement of the ring relative to the support, and downwardly extending brush elements carried by the ring and adapted to engage the surface of the tables.

6. Apparatus for cleaning plaster from plate glass tables mounted for movement along a track, comprising a support mounted for rotation about a vertical axis above the tables, power means for rotating the support about its axis, a floating ring secured to the support so as to be rotated thereby and comprising a horizontal flange provided with a series of spaced slots, a brush element for each slot comprising a plate resting on said flange above the slot and having downwardly extending flexible metal strips to engage the surface of the table, and releasable means for securing the plates to the flange comprising a clamping member between the opposing ends of each of said pair of plates having its ends overlying the ends of the plates, and screw means intermediate the ends of said members for securing them to the flange.

HERMAN S. HEICHERT.